United States Patent [19]
MacNeil

[11] Patent Number: 5,207,989
[45] Date of Patent: May 4, 1993

[54] SEAL FOR CATALYTIC CONVERTER AND METHOD THEREFOR

[75] Inventor: Gerald F. MacNeil, Bristol, R.I.

[73] Assignee: ACS Industries, Inc., Woonsocket, R.I.

[21] Appl. No.: 673,353

[22] Filed: Mar. 22, 1991

[51] Int. Cl.[5] ............................................. B01D 53/36
[52] U.S. Cl. ..................................... 422/179; 422/180;
422/221; 422/222; 55/502; 55/509; 55/523;
55/524; 55/DIG. 30; 428/241; 428/245;
428/324; 106/626; 264/279
[58] Field of Search ............... 422/179, 180, 221, 222;
55/502, 509, 523, 524, DIG. 30; 428/241, 245,
324, 332, 913, 920; 106/626, DIG. 3; 264/279

[56] References Cited

U.S. PATENT DOCUMENTS

| | | | |
|---|---|---|---|
| 4,239,733 | 12/1980 | Foster et al. | 422/179 |
| 4,269,807 | 5/1981 | Bailey et al. | 422/179 |
| 4,305,992 | 12/1981 | Langer et al. | 428/324 |
| 4,629,605 | 12/1986 | Santiago | 422/179 |
| 4,655,842 | 4/1987 | Ou et al. | 106/288 |
| 4,780,147 | 10/1988 | Ou et al. | 106/415 |
| 4,865,818 | 9/1989 | Merry et al. | 422/179 |
| 4,929,429 | 5/1990 | Merry | 422/179 |
| 4,951,954 | 8/1990 | MacNeill | 277/230 |
| 4,999,168 | 3/1991 | Ten Eyck | 422/179 |
| 5,008,086 | 4/1991 | Merry | 422/180 |

OTHER PUBLICATIONS

Microlite Brochure-W. R. Grace and Co., Copyright 1990.

Primary Examiner—Lynn M. Kummert
Attorney, Agent, or Firm—Salter, Michaelson & Benson

[57] ABSTRACT

A high temperature resistant seal for a catalytic converter is made from a high temperature resistant material including between approximately 28 and 60 dry weight percent high temperature resistant ceramic fibers and between approximately 20 and 50 dry weight percent high aspect ratio vermiculite. The seal is formed by mixing the resistant ceramic fibers with an aqueous dispersion of high aspect ratio vermiculite, applying the resultant mixture to a monolithic catalyst structure of a catalytic converter and heating the mixture and the monolithic catalyst structure to evaporate the water from the mixture. The seal and the monolithic catalyst structure can then be assembled in a housing to form a catalytic converter.

21 Claims, 1 Drawing Sheet

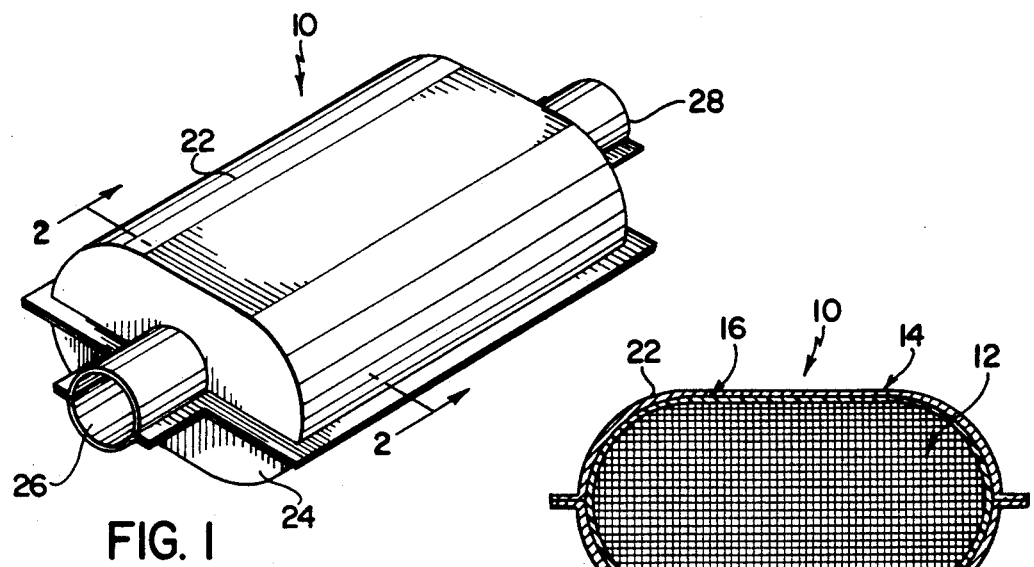
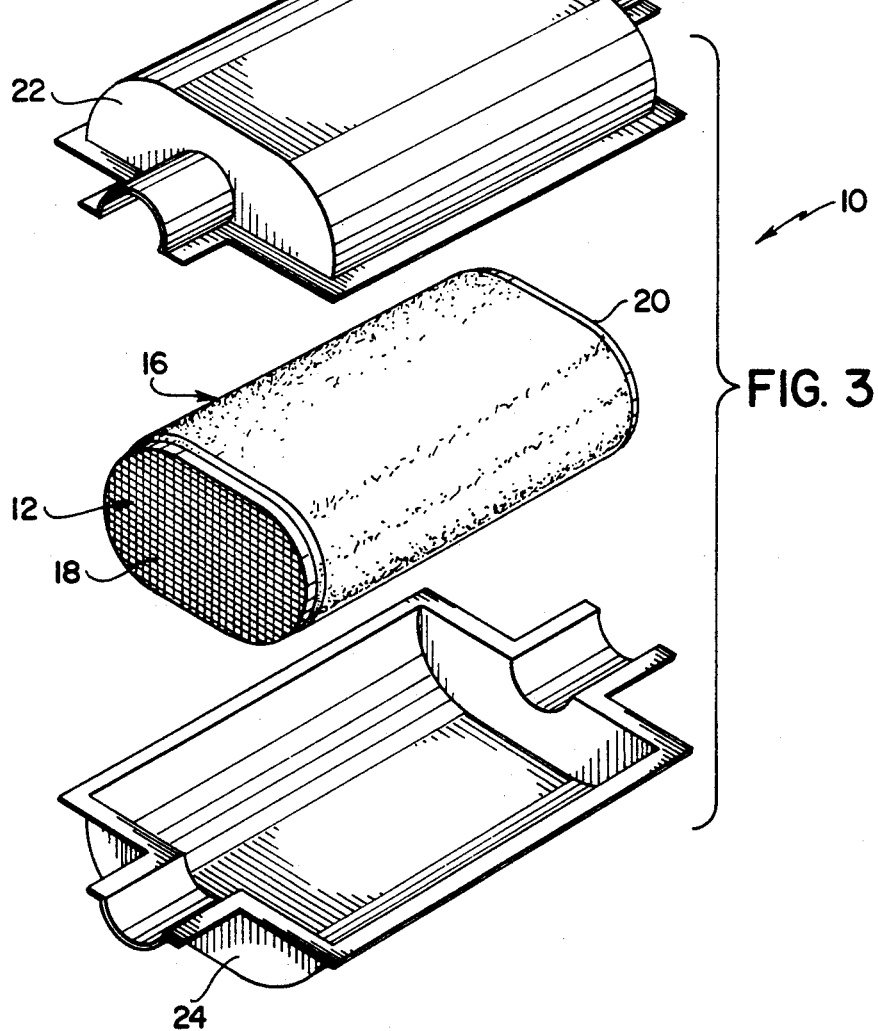
FIG. 1
FIG. 2
FIG. 3

SEAL FOR CATALYTIC CONVERTER AND METHOD THEREFOR

BACKGROUND AND SUMMARY OF THE INVENTION

The instant invention relates to high temperature resistant seals, such as those capable of withstanding continuous exposure to temperatures in excess of 2,000° F., and more particularly to a high temperature resistant seal for a catalytic converter and to a method of making the seal.

Catalytic converters have generally been found to be effective for catalytically treating the exhaust gases of internal combustion engines. In this regard, a conventional catalytic converter generally comprises a relatively fragile monolithic catalyst structure including a ceramic monolith element having a catalyst, such as platinum, deposited thereon, a metal housing having inlet and outlet ends and a supporting seal for supporting the catalyst structure in the housing so that substantially all of the exhaust gases entering the inlet end of the housing pass through the monolithic catalyst structure and outwardly through the outlet end of the housing. However, the heretofore available supporting seals for catalytic converters have generally been found to be less than satisfactory for both cushioning the catalyst structures thereof against breakage resulting from physical shocks and for sealing between the catalyst structures thereof and their respective housings. It has been found that this is partially due to the fact that because the internal components of catalytic converters can be exposed to temperatures of up to 2,000° F., the number and types of materials which are available for use as supporting seals in catalytic converters is somewhat limited. One of the most common materials utilized for such seals is stainless steel wire which has been formed, woven, and/or compacted into various configurations. However, seals made from stainless steel wire inherently have void spaces which permit certain quantities of exhaust gases to pass therethrough. Accordingly, there is a recognized need for a more effective supporting seal for supporting the monolithic catalyst structure of a catalytic converter in the housing thereof.

The instant invention provides a new high temperature resistant seal which can be effectively utilized for sealing between the catalyst structure of a catalytic converter and the housing thereof. Specifically, the seal of the instant invention is made from a high temperature resistant material which comprises between approximately 28 and 80 dry weight percent of ceramic fibers capable of withstanding continuous exposure to temperatures in excess of 2,000° F. and between approximately 20 and 50 dry weight percent of high aspect ratio vermiculite (aspect ratio equals length or width/thickness). The vermiculite has an aspect ratio of at least approximately 10 and a mean particle size of less than approximately 50 microns, and it is operative for binding the ceramic fibers together to maintain the seal material in a substantially solid compressible form. The high temperature resistant seal material preferably further includes between approximately 5 and 60 dry weight percent of low temperature expanding vermiculite (LTEV) and the high aspect ratio vermiculite is preferably operative for binding both the ceramic fibers and the LTEV together to maintain the seal material in a substantially solid compressible form. The ceramic fibers preferably comprise alumina-silica fibers which have a melting point of approximately 3,260° F. and which are capable of withstanding continuous exposure to temperatures of up to 2,300° F. Further, the fibers preferably comprise relatively long fibers of relatively small diameter so that they are able to resiliently flex to absorb shocks applied to the seal.

The high temperature resistant seal of the subject invention is preferably made by forming a mixture comprising between approximately 28 and 80 dry weight percent of ceramic fibers capable of withstanding continuous exposure to temperatures in excess of 2,000° F., between approximately 20 and 50 dry weight percent of an aqueous dispersion of high aspect ratio vermiculite and preferably also between approximately 5 and 60 dry weight percent of LTEV. The high temperature resistant seal is formed by applying this mixture to the exterior surface of a monolithic catalyst structure and heating the catalyst structure and the seal mixture to a temperature sufficient to evaporate substantially all of the water from the seal mixture. In this connection, when the ceramic fibers and the LTEV are mixed with an aqueous dispersion of high aspect ratio vermiculite, the vermiculite acts to bind the ceramic fibers and the LTEV together so that when the water is evaporated from the seal mixture the resultant material has a substantially solid compressible form.

It has been found that a high temperature resistant material of the above described type can be utilized for forming a supporting seal element which is capable of effectively sealing between the monolithic catalyst structure of a catalytic converter and the housing thereof and/or for supporting the monolithic catalyst structure in the housing. The high temperature resistant material is preferably formed around the monolithic catalyst structure so that it encircles the latter to effect a seal between the catalyst structure and the housing thereof. Further, it has been found that a seal formed by this procedure is generally sufficiently resiliently compressible to enable it to cushion the monolithic catalyst structure of a catalytic converter against breakage due to externally applied physical shocks.

Accordingly, it is primary object of the instant invention to provide an effective seal for a catalytic converter which is capable of withstanding continuous exposure to temperatures in excess of approximately 2,000° F.

Another object of the instant invention is to provide an effective method of forming a high temperature resistant seal which is capable of withstanding continuous exposure to temperatures in excess of 2,000° F.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention:

FIG. 1 is a perspective view of a catalytic converter which includes the high temperature resistant seal of the instant invention;

FIG. 2 is a sectional view thereof taken along Line 2—2 in FIG. 1; and

FIG. 3 is an exploded perspective view of the catalytic converter

DESCRIPTION OF THE INVENTION

Referring now to the drawing, the catalytic converter of the instant invention is illustrated in FIGS. 1–3 and generally indicated at 10. The catalytic converter 10 comprises a monolithic catalyst structure generally indicated at 12, an outer housing generally indicated at 14, and a high temperature resistant seal generally indicated at 16 which is operative for sealing between the monolithic catalyst structure 12 and the housing 14 as well as for cushioning the monolithic catalyst structure 12 in order to prevent breakage thereof as a result of externally applied physical shocks.

The monolithic catalyst structure 12 is of conventional construction and it comprises a monolith element 15 which is formed in a honeycomb-like construction from a material, such as a high temperature resistant ceramic. The catalyst structure 12 further comprises a catalyst, such as platinum on the surfaces of the monolith element thereof so that high temperature gases exposed to the monolithic catalyst structure 12 are catalytically converted as they pass therethrough in order to reduce the environmentally harmful qualities of the exhaust gases emitted from the catalytic converter 10. The monolithic catalyst structure 12 has an inlet end 18 and an outlet end 20 and it is adapted to permit gases to pass freely therethrough from the inlet end 18 to the outlet end 20 in order to expose the gases to the catalyst on the surfaces of the monolith element.

The housing 14 is also of generally conventional configuration and it is formed from a suitable high temperature resistant metal, such as a high temperature resistant stainless steel. The housing 14 comprises first and second housing section halves 22 and 24, respectively, which are secured together by suitable means, such as welding, so that they cooperate to form a housing for containing the monolithic catalyst structure 12. The housing 14 has an inlet end 26 and an outlet end 28 and it is constructed so that gases entering the inlet end 26 can pass through the monolithic catalyst structure 12 from the inlet end 18 thereof to the outlet end 20 thereof and then out through the outlet end 28 of the housing 14.

The seal 16 is formed so that it substantially encircles the monolithic catalyst structure 12 and it is operative for effecting a seal between the monolithic catalyst structure 12 and the housing 14 as well as for cushioning the relatively delicate monolithic catalyst structure 12 against physical shocks. Specifically, the seal 16 is formed from a high temperature resistant material comprising between approximately 28 and 80 dry weight percent of high temperature resistant ceramic fibers and between approximately 20 and 50 dry weight percent of high aspect ratio vermiculite. The ceramic fibers are selected so that they are capable of withstanding continuous exposure to temperatures in excess of approximately 2,000° F. and the high aspect ratio vermiculite is selected so that it has an aspect ratio (length or width/thickness) of at least approximately 10 and a mean particle size of less than approximately 50 microns. The high temperature resistant material preferably further includes between approximately 5 and 60 dry weight percent of LTEV and the ceramic fibers preferably comprise alumina-silica fibers.

In order to form the seal 16 a high temperature resistant material is formulated by mixing between approximately 28 and 80 dry weigh percent of ceramic fibers, such as alumina-silica fibers, with between approximately 20 and 50 dry weight percent of high aspect ratio vermiculite. Specifically, the ceramic fibers are mixed with an aqueous dispersion of high aspect ratio vermiculite preferably comprising between approximately 2 and 3 weight percent of solids. The aqueous dispersion of high aspect ratio vermiculite is blended with the ceramic fibers to produce a relatively smooth formable aqueous blend of high aspect ratio vermiculite and ceramic fibers. In the preferred method between approximately 5 and 60 dry weight percent of LTEV is also added to the blend of high aspect ratio vermiculite and ceramic fibers and the resultant mixture is mixed to produce a homogeneous pasty blend. After the components of the seal have been mixed in this manner the resultant pasty blend is applied to the longitudinal exterior surface of the monolithic catalyst structure 12 so that it encircles the catalyst structure 12. The seal material n the monolithic catalyst structure 12 are then heated to evaporate substantially all of the moisture from the seal material and to thereby form the seal 16. In this regard, it has been found that during drying the individual platelets or tiles of the high aspect ratio vermiculite bind the fibers and the LTEV together to maintain the components of the seal 16 in a solid compressible form. In any event, after the seal 16 has been formed in this manner the housing 14 is assembled around the monolithic catalyst structure 12 and the seal 16 and because of the compressible qualities of the seal 16 it can effectively conform to the internal configuration of the housing 14.

It has been found that the high temperature resistant material of the instant invention is both resistant to high temperatures and capable of absorbing physical shocks so as to protect the relatively fragile monolithic catalyst structure of a catalytic converter against breakage. In this connection, in order to achieve maximum compressibility, the aqueous dispersion of high aspect ratio vermiculite is preferably blended with the ceramic fibers so that theoretically only a single layer of platelets or tiles is laid down on each of the fibers in order to bond the fibers together. It has been found that in any event when formulated in accordance with the method as hereinabove set forth the high temperature resistant material of the instant invention has surprisingly good resilient shock absorbing qualities and that it is capable of withstanding continuous exposure to temperatures in excess of 2,000° F.

EXAMPLE

In a specific application of the method of the instant invention 104.2 grams of Fiberfrax KMTX fibers manufactured by The Carborundum Company, Fibers Division of Niagara Falls, N.Y., was blended with 625 grams of MicroLite 903 water dispersion of high aspect ratio vermiculite (7.5 wt. % solids) manufactured by W. R. Grace & Company—Con. of Cambridge, Mass. 208.3 grams of water was then added to the Fiberfrax KMTX fibers and MicroLite 903 dispersion and the resultant mixture was slowly blended to produce a continuous smooth blend of fibers, high aspect ratio vermiculite and water. 62.5 grams of LTEV manufactured by W. R. Grace & Company—Conn. was then added to this mixture and the resultant mixture was then further blended to form a smooth continuous mixture. A portion of the resultant mixture was then applied as a thick paste to the exterior surface of a monolithic catalyst structure and the monolithic catalyst structure and the seal material were heated to evaporate substantially all of the water from the seal material. Thereafter, a housing was assembled over the monolithic catalyst structure and the seal. Upon testing it was found that the seal was effectively able to seal between the catalyst structure thereof and the housing thereof so that substantially all of the gases entering the inlet end of the housing pass through the catalyst structure, and then out the outlet end of the housing. It was further found that the resultant seal was highly resistant to prolonged exposure to temperatures in excess of 2,000° F. and that it was capable of cushioning the monolithic catalyst structure thereof against physical shocks.

It is seen therefore that the instant invention provides an effective high temperature resistant seal. The seal 16 is capable of withstanding elevated temperatures for prolonged periods of time and it is also capable of absorbing shocks. Accordingly, it is seen that the high temperature resistant seal of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. A seal for a catalytic converter for automotive exhaust gases, the catalytic converter including an inner monolithic catalyst structure for passing the exhaust gases therethrough and a housing for containing the monolithic catalyst structure, the housing having an inlet end, and an outlet end, said seal comprising between approximately 28 and 80 dry weight percent of ceramic fibers capable of withstanding continuous exposure to temperatures in excess of 2,000° F. and between approximately 20 and 50 dry weight percent of high aspect ratio vermiculite, said vermiculite having an aspect ratio of at least approximately 10 and a mean particle size of less than approximately 50 microns, said high aspect ratio vermiculite binding said ceramic fibers together to maintain said seal in a substantially solid compressible form, said seal substantially encircling the catalyst structure to effect a seal between the catalyst structure and the housing.

2. The seal of claim 1 further comprising between approximately 5 and 60 dry weight percent of low temperature expanding vermiculite, said high aspect ratio vermiculite binding both said ceramic fibers and said low temperature expanding vermiculite together to maintain said seal in a substantially solid compressible form.

3. In the seal of claim 1, said fibers comprising alumina-silica fibers.

4. A method of making a seal for a catalytic converter comprising
   a. forming a paste-like seal material comprising between approximately 28 and 80 dry weight percent of ceramic fibers capable of withstanding continuous exposure to temperatures in excess of 2000° F. and between approximately 20 and 50 dry weight percent of an aqueous dispersion of high aspect ratio vermiculite, said vermiculite having an aspect ratio of at lest approximately 10 and a mean particle size of less than approximately 50 microns,
   b. applying said paste-like seal material to an outer surface of a monolithic catalyst structure so that said seal material substantially encircles the monolithic catalyst structure; and
   c. heating said monolithic catalyst structure and said paste-like seal material to evaporate substantially all of the water form said seal material and to thereby form said seal.

5. In the method of claim 4, said ceramic fibers comprising alumina-silica fibers.

6. In the method of claim 4, said seal material further comprising between approximately 5 and 60 dry weight percent of low temperature expanding vermiculite.

7. A method of forming a catalytic converter for automotive exhaust gases comprising applying an aqueous blend of a high temperature resistant seal material to a monolithic catalyst structure, said monolithic catalyst structure having inlet and outlet ends and including a supporting monolith and a catalyst on said supporting monolith, said seal material comprising between approximately 28 and 80 dry weight percent of ceramic fibers capable of withstanding continuous exposure to temperatures in excess of 2000° F. and between approximately 20 and 50 dry weight percent of an aqueous dispersion of high aspect ratio vermiculite, said high aspect ratio vermiculite having an aspect ratio of at least approximately 10 and a mean particle size of less than approximately 50 microns, said seal material being applied to said monolithic catalyst structure so that said seal material substantially encircles the monolithic catalyst structure, said method further comprising heating said monolithic catalyst structure and said seal material thereon to evaporate substantially all of the water from said seal material in order to form said seal, and assembling a housing on said monolithic catalyst structure, said housing having inlet and outlet ends and being adapted for sealingly containing said catalyst structure so that he inlet and outlet ends of said catalyst structure correspond to the inlet and outlet ends, respectively, of said housing, whereby substantially all of the gases passing through said housing form said inlet end to said outlet end thereof pass through said monolithic catalyst structure from said inlet end to said outlet end thereof.

8. In the method of claim 7, said ceramic fibers comprising alumina-silica fibers.

9. In the method of claim 7, said seal material further comprising between approximately 15 and 57 dry weight percent of low temperature expanding vermiculite.

10. A catalytic converter for automotive exhaust gases comprising catalyst structure means for passing the exhaust gases therethrough, said catalyst structure means having inlet and outlet ends and including a supporting monolith and a catalyst on said supporting monolith, a housing for containing said catalyst structure means, said housing having inlet and outlet ends and containing said catalyst structure means so that the inlet and outlet ends of said catalyst structure means correspond to the inlet and outlet ends, respectively, of said housing, and high temperature support means between said catalyst structure means and said housing means for supporting said catalyst structure means in said housing, said high temperature support means comprising between approximately 28 and 80 dry weight percent of ceramic fibers capable of withstanding continuous exposure to temperature sin excess of 2000° F. and between approximately 20 and 50 dry weight percent of high aspect ratio vermiculite, said vermiculite having an aspect ratio of at least approximately 10 and a means particle size of less than approximately 50 microns, said high aspect ratio vermiculite binding said ceramic fibers together to maintain said support means in a substantially solid form.

11. In the catalytic converter of claim 10, said support means further comprising between approximately 5 and 60 dry weight percent of low temperature expanding vermiculite.

12. In the catalytic converter of claim 10, said fibers comprising alumina-silica fibers.

13. In the catalytic converter of claim 10, said high temperature support means also effecting a seal between said catalyst structure means and said housing so that substantially all of the gases passing through said housing from said inlet end to said outlet end thereof passes through said catalyst structure means.

14. A catalytic converter for automotive exhaust gases comprising a monolithic catalyst structure for passing the exhaust gases therethrough, said monolithic catalyst structure having inlet and outlet ends, a housing for containing said monolithic catalyst structure, said housing having inlet and outlet ends and containing said monolithic catalyst structure so that the inlet and outlet ends of said monolithic catalyst structure correspond to the inlet and outlet ends of said housing, respectively, and support means between said housing and said monolithic catalyst structure for supporting the monolithic catalyst structure in said housing, said support means including a ring of high temperature resistant material substantially encircling said monolithic catalyst structure, said ring of high temperature resistant material comprising between approximately 28 and 80 dry weight percent of ceramic fibers capable of withstanding continuous exposure to temperature in excess of 2000° F. and between approximately 20 and 50 dry weight percent of high aspect ratio vermiculite, said high aspect ratio vermiculite having an aspect ratio of at least approximately 10 and a mean particle of less than approximately 5 microns, said high aspect ratio vermiculite binding said ceramic fibers together to maintain said support means in a substantially solid form.

15. In the catalytic converter of claim 14, said ceramic fibers comprising alumina-silica fibers.

16. In the catalytic converter of claim 14, sad high temperature resistant material further comprising between approximately 5 and 60 dry weight percent of low temperature expanding vermiculite.

17. A catalytic converter for automotive exhaust gases comprising catalyst structure means for passing the exhaust gases therethrough, said catalyst structure means having inlet and outlet ends and including a supporting monolith and a catalyst on said supporting monolith, a housing for containing said catalyst structure means, said housing having inlet and outlet ends and containing said catalyst structure means so that the inlet ad outlet ends of said catalyst structure means correspond to he inlet and outlet ends, respectively, of said housing; and high temperature resistant seal means for sealing between said catalyst structure means and said housing to assure that substantially all of the exhaust gases entering the inlet end of said hosing pass through said catalyst structure means, said high temperature resistant seal means comprising between approximately 28 and 80 dry weigh percent of ceramic fibers capable of withstanding continuous exposure to temperatures in excess of 2000° F. and between approximately 20 and 50 dry weight percent of high aspect ratio vermiculite, said vermiculite having an aspect ratio of at least approximately 10 and a mean particle size of less than approximately 50 microns, said high aspect ratio vermiculite binding said ceramic fibers together to maintain said seal means in a substantially solid form.

18. In the catalytic converter of claim 17, said seal means further comprising between approximately 5 and 60 dry weight percent of low temperature expanding vermiculite.

19. In the catalytic converter of claim 17, said seal means also functioning to support said catalytic structure means in said housing.

20. In the catalytic converter of claim 17, said high temperature resistant seal means encircling said catalyst structure means.

21. In the catalytic converter of claim 17, said ceramic fibers comprising alumina-silica fibers.

* * * * *